(12) United States Patent
Septon et al.

(10) Patent No.: US 11,949,463 B1
(45) Date of Patent: Apr. 2, 2024

(54) MEASUREMENT BASED METHODS FOR ACCESSING AND CHARACTERIZING QUANTUM COMMUNICATION CHANNELS

(71) Applicants: Mellanox Technologies, Ltd., Yokneam (IL); Bar-Ilan University, Ramat Gan (IL)

(72) Inventors: Tali Septon, Haifa (IL); Elad Mentovich, Tel Aviv (IL); Moshe B Oron, Rehovot (IL); Yonatan Piasetzky, Tel Aviv (IL); Yuval Idan, Rishon LeTsiyon (IL); Eliahu Cohen, Rehovot (IL); Avshalom C Elitzur, Zavdiel (IL); Taylor Lee Patti, Orange, CA (US)

(73) Assignee: Mellanox Technologies, Ltd., Yokneam (IL)

(*) Notice: Subject to any disclaimer, the term of this patent is extended or adjusted under 35 U.S.C. 154(b) by 0 days.

(21) Appl. No.: 18/220,990

(22) Filed: Jul. 12, 2023

(30) Foreign Application Priority Data

Dec. 8, 2022 (IL) .......................................... 298938

(51) Int. Cl.
*H04B 10/70* (2013.01)
(52) U.S. Cl.
CPC .................................... *H04B 10/70* (2013.01)
(58) Field of Classification Search
CPC ..................................................... H04B 10/70
See application file for complete search history.

(56) References Cited

U.S. PATENT DOCUMENTS

| | | | |
|---|---|---|---|
| 6,741,374 B2 | 5/2004 | Pittman |
| 7,881,473 B2 | 2/2011 | Wang |
| 8,369,710 B2 | 2/2013 | Thiele |
| 8,433,070 B2 | 4/2013 | Habif |
| 9,077,577 B1 | 7/2015 | Ashrafi |
| 9,356,780 B2 | 5/2016 | Tanizawa |
| 9,692,523 B2 | 6/2017 | Smith |
| 9,876,639 B2 | 1/2018 | Choi |

(Continued)

OTHER PUBLICATIONS

Avron, J. et al., "Quantum advantage and noise reduction in distributed quantum computing," Physical Review A., Aug. 23, 2021, 104.5: p. 052404.

(Continued)

*Primary Examiner* — Seung C Sohn
(74) *Attorney, Agent, or Firm* — Moore & Van Allen PLLC; Michael M. McCraw

(57) ABSTRACT

Various embodiments of the present disclosure are directed to accessing a quantum communication channel undetected and/or characterizing this communication channel based upon attempted access. An example method includes accessing a quantum communication channel transmitting one or more qubits. The method includes the introduction of a noise signal to the quantum communication channel and then applying in its absence one or more weak or variable-strength measurements to the quantum communication channel. A strength of at least one measurement of the one or more measurements is based at least in part upon the current noise signal. The method further includes obtaining information associated with the one or more qubits based on the one or more measurements.

20 Claims, 5 Drawing Sheets

(56) References Cited

U.S. PATENT DOCUMENTS

| | | | |
|---|---|---|---|
| 10,594,408 | B2 | 3/2020 | Bishop |
| 10,855,457 | B1 | 12/2020 | Vakili |
| 10,862,677 | B2 | 12/2020 | Bitauld |
| 11,163,535 | B1 | 11/2021 | Vakili |
| 11,240,013 | B1 | 2/2022 | Vakili |
| 11,309,970 | B2 | 4/2022 | Woodward |
| 11,343,270 | B1 | 5/2022 | Carter, Jr. |
| 11,405,115 | B2 | 8/2022 | Gimeno-Segovia |
| 11,444,636 | B2 | 9/2022 | Lucarelli |
| 11,451,308 | B1 | 9/2022 | Bucklew |
| 11,483,144 | B1 | 10/2022 | Vakili |
| 11,664,983 | B2 | 5/2023 | Mentovich |
| 11,689,223 | B2 * | 6/2023 | Aspuru-Guzik ....... G06N 10/70 714/752 |
| 2002/0067882 | A1 | 6/2002 | Guilfoyle |
| 2003/0118282 | A1 | 6/2003 | Tatum |
| 2004/0013437 | A1 | 1/2004 | Wiltsey |
| 2004/0037496 | A1 | 2/2004 | Pierce |
| 2004/0126072 | A1 | 7/2004 | Hoon Lee |
| 2004/0202218 | A1 | 10/2004 | Thornton |
| 2005/0078826 | A1 | 4/2005 | Takeuchi |
| 2006/0013396 | A1 | 1/2006 | Kollmitzer |
| 2006/0245762 | A1 | 11/2006 | Thiele |
| 2008/0137858 | A1 | 6/2008 | Gelfond |
| 2008/0165957 | A1 | 7/2008 | Kandasamy |
| 2008/0175385 | A1 | 7/2008 | Lee |
| 2008/0292095 | A1 | 11/2008 | Vig |
| 2008/0292102 | A1 | 11/2008 | Wang |
| 2009/0070402 | A1 | 3/2009 | Rose |
| 2009/0180615 | A1 | 7/2009 | Trifonov |
| 2011/0129225 | A1 | 6/2011 | Gostin |
| 2011/0150502 | A1 | 6/2011 | Zhao |
| 2012/0177201 | A1 | 7/2012 | Ayling |
| 2013/0101119 | A1 | 4/2013 | Nordholt |
| 2016/0218867 | A1 | 7/2016 | Nordholt |
| 2017/0040772 | A1 | 2/2017 | Raz |
| 2017/0214525 | A1 | 7/2017 | Zhao |
| 2017/0344898 | A1 | 11/2017 | Karimi |
| 2018/0069631 | A1 | 3/2018 | Ashrafi |
| 2018/0365585 | A1 | 12/2018 | Smith |
| 2019/0123847 | A1 | 4/2019 | Bush |
| 2019/0379463 | A1 | 12/2019 | Shields |
| 2020/0044836 | A1 | 2/2020 | Kim |
| 2021/0083864 | A1 | 3/2021 | Bush |
| 2021/0105135 | A1 | 4/2021 | Figueroa |
| 2021/0152347 | A1 | 5/2021 | Cambou |
| 2021/0174237 | A1 | 6/2021 | Mentovich |
| 2021/0231879 | A1 | 7/2021 | Mathai |
| 2021/0342161 | A1 | 11/2021 | Lauer |
| 2022/0006627 | A1 | 1/2022 | Ko |
| 2022/0209942 | A1 | 6/2022 | Mentovich et al. |
| 2022/0209943 | A1 | 6/2022 | Syrivelis |
| 2022/0224996 | A1 | 7/2022 | Nickerson |
| 2022/0245496 | A1 | 8/2022 | Singh |
| 2023/0059433 | A1 | 2/2023 | Lecocq |
| 2023/0132571 | A1 | 5/2023 | Bakopoulos |
| 2023/0370255 | A1 * | 11/2023 | Fehenberger ........... H04L 1/004 |

OTHER PUBLICATIONS

Beals, R. et al., "Efficient Distributed Quantum Computing," Proceedings of the Royal Society A: Mathematical, Physical and Engineering Sciences, Nov. 19, 2012, 469, No. 2153: p. 20120686.

"Bidirectional (BiDi) WDM Transceivers," Jun. 1, 2021 [online]. Retrieved from the internet: <https://community.fs.com/ blog/a-brief-introduction-of-bidi-sfp-transceiver.html>.

Chen, W. et al., "A Novel Picoseconds Optical Pulse Source for Free-Space Decoy-State Quantum Key Distribution," 2013 IEEE Nuclear Science Symposium and Medical Imaging Conference. pp. 1-4.

Cochran, R. et al., "Qubit-Based Clock Synchronization for QKD Systems Using a Bayesian Approach," Entropy 2021, 23.8, p. 988. <https://doi.org/10.3390/e23080988>.

Diadamo, S. et al., "Distributed Quantum Computing and Network Control for Accelerated VQE," Quantum Physics Systems and Control. IEEE Transactions on Quantum Engineering 2021. pp 1-21. <https://doi.org/10.1109/TQE.2021.3057908>.

Takahashi, Dean, "Twitch cofounder Justin Kan is back with NFT gaming market place Fractal," Gamesbeat, (Dec. 2021), <https://venturebeat.com/2021/12/13/twitch-cofounder-justin-kan-is-back-with-nft-gaming-marketplace-fractal/>.

Vest, G. et al., "Design and Evaluation of a Handheld Quantum Key Distribution Sender module," 2014, IEEE Journal of Selected topics in Quantum Electronics, vol. 21, No. 3, pp. 1-7.

Wengerowsky, S. et al. "An entanglement-based wavelength-multiplexed quantum communication network," Nature 564, pp. 225-228, Dec. 12, 2018 [online]. Retrieved from the Internet: <https://doi.org/10.1038/s41586-018-0766-y>.

Humble, T. et al., "Quantum Computers for High-Performance Computing," IEEE Micro, 41.5 (2021): pp. 15-23.

Jiang, N. et al., "Secure key distribution applications of chaotic lasers," 2016, Proc. of SPIE vol. 10026, pp. 1-8.

Kass, Michael, LinkedIn post entitled "Plumbing the Metaverse with USD," (Mar. 2021), <https://www.linkedin.com/pulse/plumbing-metaverse-usd-michael-kass/trackingId=y2PXzhkR76bnLEoMzY2ilw%3D%3D>.

Kim, J. et al., "Technology-Driven, Highly-Scalable Dragonfly Topology," IEEE, 2008 International Symposium on Computer Architecture, 2008, pp. 77-88.

Lambert, R. et al., "Quantum-classical path integral. I. Classical memory and quantum nonlocality," The Journal of Chemical Physics, vol. 137, pp. 1-10, 2012.

Liu, Xu et al., "An entanglement-based quantum network based on symmetric dispersive optics quantum key distribution," APL Photonics 5, 076104, Jul. 8, 2020 [online]. Retrieved from the Internet: <https://doi.org/10.1063/5.0002595>.

Mellette, W. et al., "Expanding across time to deliver bandwidth efficiency and low latency," 17th USENIX Symposium on Networked Systems Design and Implementation, Feb. 2020, 19 pages.

Navarrete, Glynis, "What is a PCIe Switch?," 2021.

Preskill, J., "Quantum Computing in the NISQ era and beyond," Institute for Quantum Information and Matter and Walter Burke Institute for Theoretical Physics, California Institute of Technology, Pasadena CA 91125, arXiv:1801.00862v3, Jul. 31, 2018, <https://doi.org/10.22331/q-2018-08-06-79>.

Zahringer, F. et al., "Realization of a Quantum Walk with One and Two Trapped Ions," Phys. Rev. Lett. 104, 100503, Mar. 9, 2010, <https://journals.aps.org/prl/abstract/10.1103/PhysRevLett.104.100503>.

Shor, P., "Algorithms for Quantum Computation: Discrete Logarithms and Factoring," Proceedings of the 35th Annual Symposium on Foundations of Computer Science, pp. 124-134, Nov. 20-22, 1994.

Singh, S. et al., "Universal quantum computing using single-particle discrete-time quantum walk," Sci Rep 11, 11551 (2021), <https://doi.org/10.1038/s41598-021-91033-5>.

Tessinari, R. et al., "Field trial of dynamic DV-QKD networking in the SDN controlled fully meshed optical metro network of the Bristol city 5GUK test network," ECOC2019, Dublin Ireland, 4 pages.

Venegas-Andraca, S.E., "Quantum walks: a comprehensive review," Quantum Inf Process 11.5, pp. 1015-1106 (2012), <https://doi.org/10.1007/s11128-012-0432-5>.

Bakopoulos, P. et al., Pending U.S. Appl. No. 17/686,475, filed Mar. 4, 2022.

Ganju, S. et al., Pending U.S. Appl. No. 18/091,214, filed Dec. 29, 2022.

Seifoory, H. et al., Pending U.S. Appl. No. 18/108,145, filed Feb. 10, 2023.

Seifoory, H. et al., Pending U.S. Appl. No. 18/137,737, filed Apr. 21, 2023.

Septon, T. et al., Pending U.S. Appl. No. 18/221,007, filed Jul. 12, 2023.

Septon, T. et al., Pending U.S. Appl. No. 18/123,555, filed Mar. 20, 2023.

(56) References Cited

OTHER PUBLICATIONS

Septon, T. et al., Pending U.S. Appl. No. 17/878,464, filed Aug. 1, 2022.
Mentovich, E. et al., Pending U.S. Appl. No. 17/828,854, filed May 31, 2022.
Ganju, S. et al., Pending U.S. Appl. No. 17/863,779, filed Jul. 13, 2022.
Scheps, K. et al., Pending U.S. Appl. No. 17/660,349, filed Apr. 22, 2022.
Vegas Olmos, J. et al., Pending U.S. Appl. No. 17/675,669, filed Feb. 18, 2022.
Mentovich, E. et al., Pending U.S. Appl. No. 18/137,755, filed Apr. 21, 2023.
Seifoory, H. et al., Pending U.S. Appl. No. 18/137,758, filed Apr. 21, 2023.
Mentovich, E. et al., Pending U.S. Appl. No. 18/135,954, filed Apr. 18, 2023.

* cited by examiner

MEASUREMENT BASED METHODS FOR ACCESSING AND CHARACTERIZING QUANTUM COMMUNICATION CHANNELS

CROSS-REFERENCE TO RELATED APPLICATIONS

This application claims priority to Israel Patent Application No. 298938, filed Dec. 8, 2022, the entire contents of which application are hereby incorporated herein by reference.

TECHNOLOGICAL FIELD

Embodiments of the present disclosure relate generally to communications and, in particular, to techniques for accessing and/or characterizing quantum communication channels.

BACKGROUND

Communication networks, systems, channels, and the like are employed in a variety of applications in order to transmit data from one location to another. In order to prevent outside actors, such as an eavesdropper, from obtaining or accessing information of these private communications, various cryptographic techniques may be employed. For example, communication systems may attempt to secure information by leveraging quantum keys distributed between the parties to the communication. Through applied effort, ingenuity, and innovation, various deficiencies and problems associated with conventional communication channels have been solved by developing solutions that are configured in accordance with the embodiments of the present disclosure, many examples of which are described in detail herein.

BRIEF SUMMARY

Systems, methods, apparatuses, and computer program products for accessing and characterizing quantum communication channels are provided. With reference to an example method, the method may include accessing a quantum communication channel transmitting one or more qubits; and determining a current noise signal associated with the quantum communication channel. The method may further include applying one or more measurements to the quantum communication channel where a strength of at least one measurement of the one or more measurements may be based at least in part upon the current noise signal. The method may include obtaining information associated with the one or more qubits based on the one or more measurements.

In some embodiments, the one or more measurements may include at least one weak measurement.

In some embodiments, in response to determining the current noise signal associated with the quantum communication channel and prior to applying the one or more measurements, the method may further include applying an artificial noise signal to the quantum communication channel and subsequently eliminating the artificial noise signal from the quantum communication channel.

In some further embodiments, the application of the artificial noise signal to the quantum communication channel may occur in an instance in which the current noise signal fails to satisfy a detectability threshold.

In some embodiments, the current noise signal may be determined at least in part based upon at least one piece of equipment associated with the quantum communication channel.

In some embodiments, the method may further include performing a plurality of iterations of the one or more measurements over a plurality of quantum communication sequences and the plurality of quantum communication sequences may share at least an identifier of a specified user. In such an embodiment, the method may further include determining an expected preparation or measurement basis of the one or more qubits based on the plurality of iterations of the one or more measurements over the plurality of quantum communication sequences.

In some further embodiments, the method may further include collecting, based on the plurality of iterations of the one or more measurements over the plurality of quantum communication sequences, a database of quantum communications associated with at least the identifier of the specified user.

In some further embodiments, the method may further include modifying the strength of the one or more measurements based at least in part upon data received from the database of quantum communications.

The above summary is provided merely for summarizing some example embodiments to provide a basic understanding of some aspects of the present disclosure. Accordingly, it should be appreciated that the above-described embodiments are merely examples and should not be construed to narrow the scope or spirit of the disclosure in any way. It will be appreciated that the scope of the present disclosure encompasses many potential embodiments in addition to those here summarized, some of which are further described below.

BRIEF DESCRIPTION OF DRAWINGS

Figure 1:
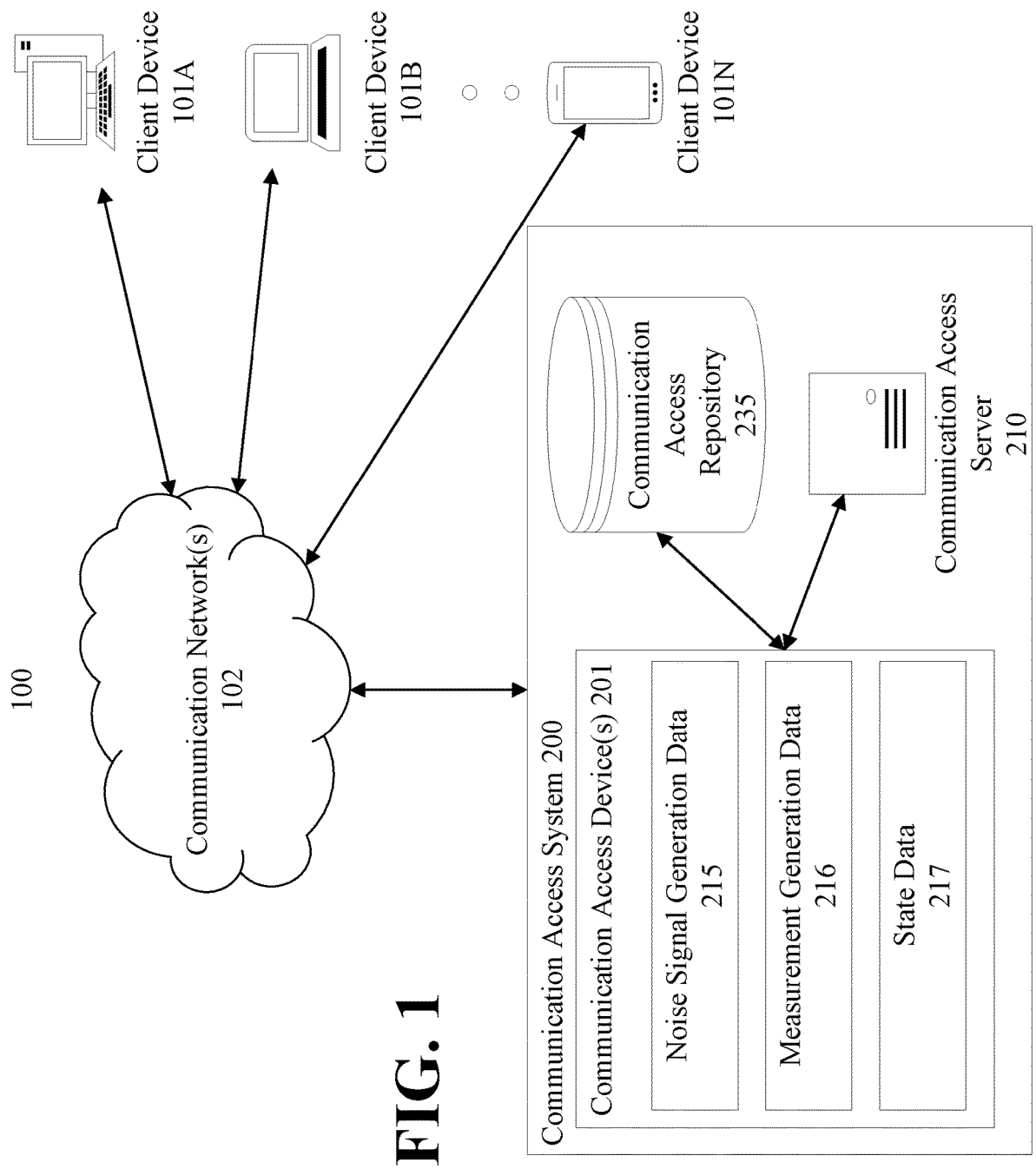
Figure 2:
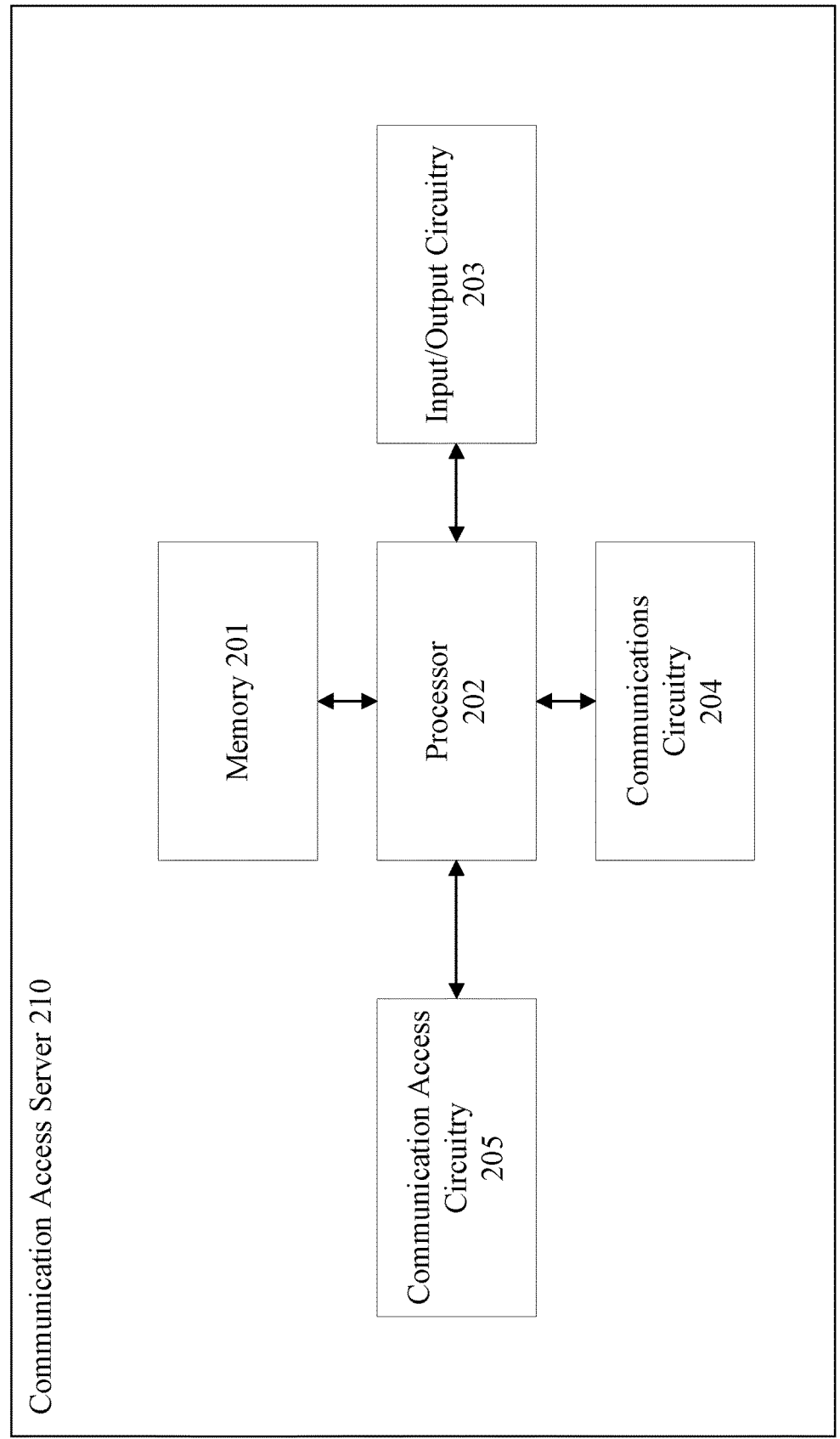
Figure 3:
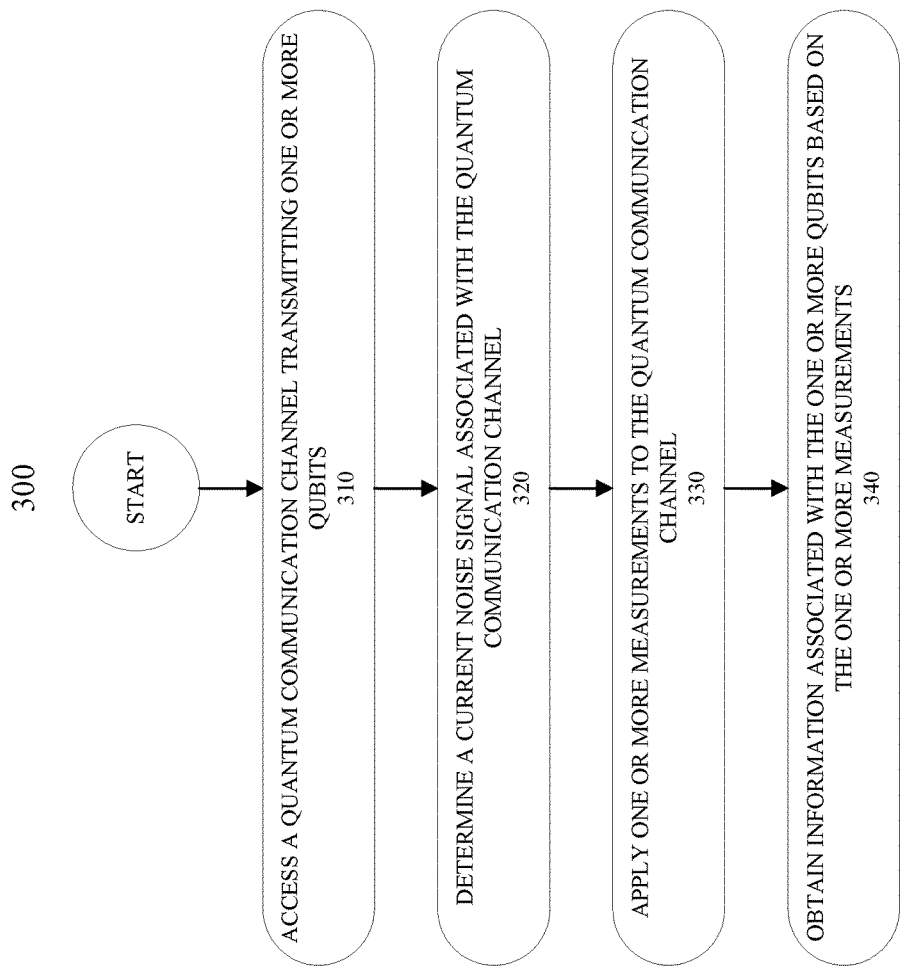
Figure 4:
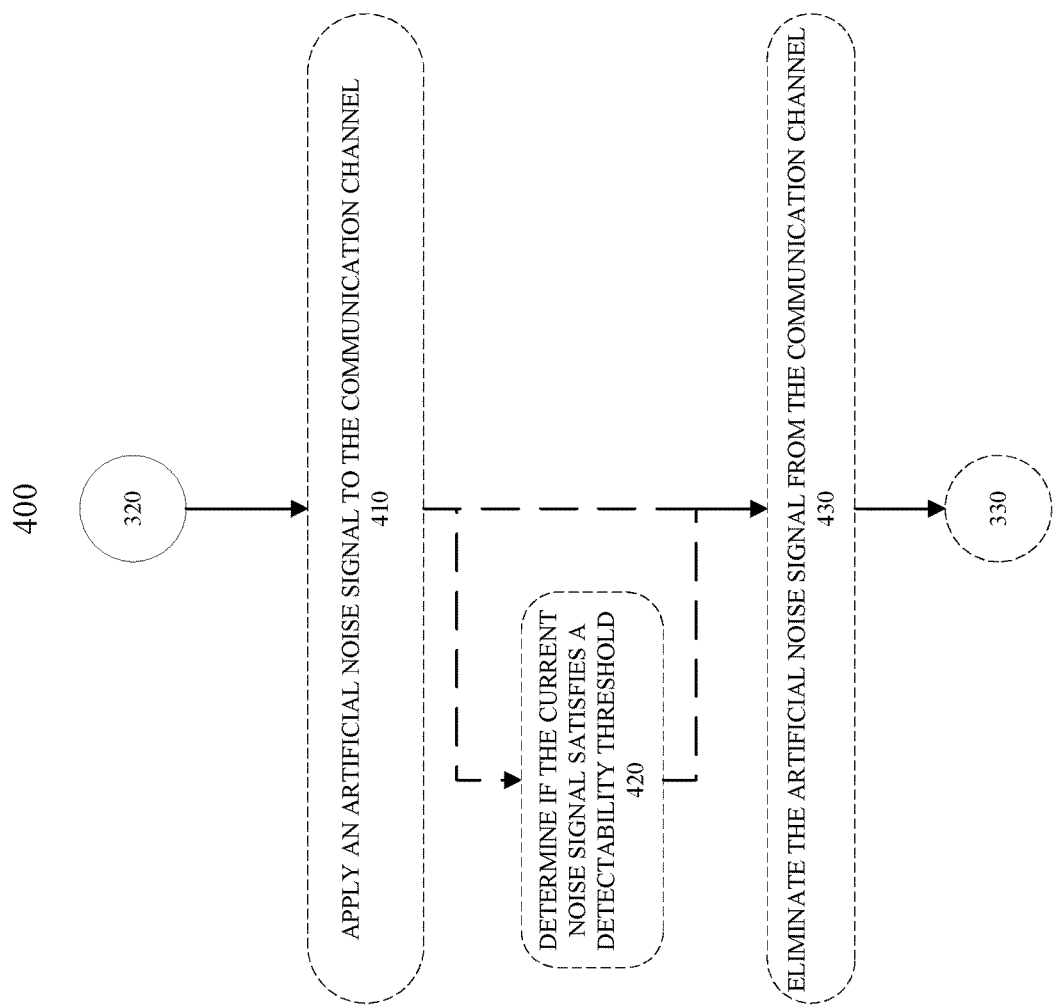
Figure 5:
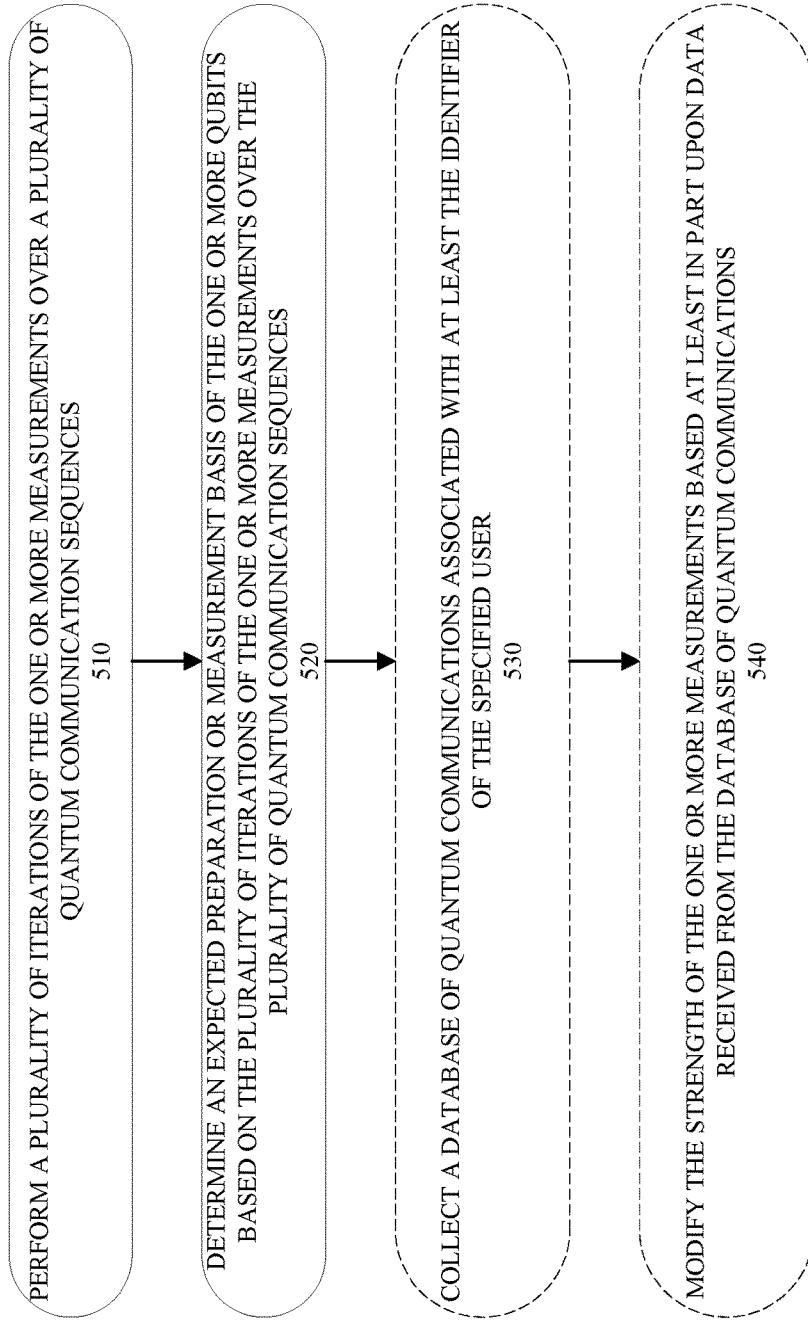

Having thus described the disclosure in general terms, reference will now be made to the accompanying drawings, which are not necessarily drawn to scale, and wherein:

FIG. 1 is a block diagram of an example communication access system, in accordance with one or more embodiments of the present disclosure;

FIG. 2 is a block diagram of an example communication access server, in accordance with one or more embodiments of the present disclosure;

FIG. 3 is a flowchart illustrating an example method for obtaining information associated with one or more qubits based on one or more measurements, in accordance with one or more embodiments of the present disclosure;

FIG. 4 is a flowchart illustrating an example method for artificial noise signal application, in accordance with one or more embodiments of the present disclosure; and FIG. 5 is an example flowchart illustrating an example method for measurement strength modification, in accordance with one or more embodiments of the present disclosure.

DETAILED DESCRIPTION

Definitions

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as may be used herein are not provided to convey any qualitative assessment, but instead merely to convey an illustration of an example.

The terms "communication channel," "quantum communication channel," or "quantum communications channel" may refer to an optical line (e.g., fiber, or the like a quantum line, and/or free space over which quantum information is transmitted through particles, such as qubits exchanged using one or more quantum cryptographic techniques (e.g., quantum key distribution) that rely on quantum properties, such as quantum uncertainty, superposition, and/or quantum entanglement. Although described herein with reference to a quantum communication channel, the present disclosure contemplates that the techniques described herein may be applicable to any communication channel. Furthermore, although described herein with reference to example embodiments in which the communication channel refers to an optical fiber or free space, the present disclosure contemplates that a communication channel may refer to any mechanism, structure (e.g., or absence thereof), or the like through which quantum information-based communications (e.g., photons qubits, single or entangled quantum particles, etc.) may propagate or otherwise travel.

The term "photon" refers to the object in quantum communication systems within which data is encoded. A "qubit" a quantum bit and the quantum equivalent of a bit in classical computing. Although described herein with reference to qubits transmitted via a quantum communication channel, the present disclosure contemplates that the techniques described herein may be applicable to quantum particles of any type or information encoded in any way for transmission via quantum communication channels. The term "quantum basis," refers to the way in which data is encoded in an example photon where the data is the value of the encoded information. This encoding may be accomplished via sets of orthogonal quantum states, including, but not limited to, pairs of photonic polarization states. The pairs of photonic polarization states may include, for example, the rectilinear, diagonal, and circular photonic polarization states. The "rectilinear basis" may refer to the pair of rectilinear photonic polarization states including the horizontal photon polarization state $|0\rangle$ and the vertical photon polarization state $|1\rangle$. The "diagonal basis" may refer to the pair of diagonal and anti-diagonal photonic polarization states at 45 135 degrees, respectively. The "circular basis" may refer to the pair of circular photonic polarization states include the left circular photon polarization state $|L\rangle$ and the right circular photon polarization state $|R\rangle$. The terms "state" or "states" may refer to a basic unit of quantum information comprising a two-level quantum mechanical system, such as the polarization of a single photon (e.g., a photon encoded using a quantum basis as described above).

The term "noise signal" may refer to anything that interferes, disrupts, or reduces the effectiveness of the communication of data from a transmitter to a receiver. As described herein, the devices (e.g., hardware, equipment, or the like) used to create quantum communication channels may inherently provide or otherwise be associated with noise or a current noise signal. In some instances, the techniques employed or otherwise used by the communication systems described herein may be associated with or generate noise (e.g., any interference or disturbance to the intended signal or signal that is generated for transmission). To this end, a noise signal as used herein may refer to any interference experienced by a quantum communication channel regardless of source.

The term "artificial noise signal" may refer to any noise or noise signal applied, injected, etc. to an example quantum communication channel that is applied, passively or actively, by a third-party actor (e.g., a party other than the transmitting party and the receiving party). For example, an artificial noise signal may refer to noise injected or otherwise applied to the communication channel by a third-party actor (e.g., an eavesdropper) accessing the quantum communication channel. In some embodiments, the artificial noise signal may refer to a noise signal configured to copy or emulate the noise signal inherent in the communications channel such that the artificial noise signal and the current noise signal inherent in the quantum communications channel appear to be the same signal (e.g., are indistinguishable from one another). In other words, the artificial noise signal described herein may operate to mask the attempts by an eavesdropper to access data transmitted via the communication channel. Furthermore, following application of the artificial noise signal, the variable strength or weak measurements applied to the quantum communication channel as described herein may replace the artificial noise signal.

The terms "measurement" or "measurements" may refer to a manipulation of qubits in a quantum communication channel to yield information regarding the state of each qubit. An example measurement as described herein may be configured to ascertain or determine any parameter, attribute, etc. of the communication channel and may further be configured to determine, infer, or detect any information, content, and/or data transmitted by the communication channel. For example, the quantum communication channels described herein may be used for quantum key distribution in order to distribute keys used to encrypt or otherwise secure data transmitted by these or other communication channels. As such, a measurement described herein may refer to any manipulation that attempts to identify or determine a bit string including at least a part of the keys used to encrypt the underlying data transmitted by the communication channels. In some embodiments, the measurement may be performed or otherwise determined by a system like that described herein, (e.g., communication access system 200 and/or communication access server 210).

The terms "strength" or "magnitude" may refer to the physical coupling (e.g., mutual interaction) between the measuring system and the measured signal and/or qubit stream. The strength or magnitude may be used with reference to example measurements as described above and may further be variable (e.g., variable strength measurements). In some examples described herein, the strength of the measurement may be referred to as "weak" (e.g., a weak measurement) in that the strength of the measurement is such that the observer or eavesdropper obtains less information (relative a "strong" measurement) about the underlying data but also disturbs the communication channel less (e.g., relative a "strong" measurement). Furthermore, the term "weak measurement" may also encompass any variable-strength measurement that does not necessarily lead to a wave function collapse as described herein. In other words, the measurements referred to hereinafter as "weak measurements" do not require a particular or defined strength or magnitude, but instead refer to any measurement or collection of measurements that do not necessarily result in collapse of the wavefunction of the measure signal and/or qubit.

The term "identifier" may refer to one or more items of data by which a specified user of the system (e.g., communication access system 200 and/or communication access server 210) may be uniquely identified. For example, an identifier may comprise ASCII text, a pointer, a memory address, authentication and/or authentication hash code, and the like. In some embodiments, the identifier may be used to refer to any cryptographic key (e.g., distributed quantum key or the like) that is associated with a particular user for encrypting, transmitting, and decrypting data associated with the particular user and/or encrypted communication between users. As would be evident in light of the applications of the communications described herein, the particular quantum key assigned to or associated with a particular user and/o encrypted communication between users may be modified, changed, updated, etc. (e.g., vary based upon the particular communication or be updated with each communication) such that the identifier defined herein may equally be updated to include or otherwise be associated with the new or modified quantum key assigned to a particular user, and/or decrypt encrypted communication between users. The present disclosure contemplates that the identifier described herein may refer to any data structure configured to store or otherwise be indicative of any data associated with a particular user, user communication, or the like based upon the intended application of the embodiments described herein.

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure.

The term "comprising" means "including, but not limited to." The term comprising should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The terms "server" or "server device" are used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "client device" refers to computer hardware and/or software that is configured to access a service made available by a server. The server is often (but not always) on another computer system, in which case the client device accesses the service by way of a network. Client devices include, without limitation, smart phones, tablet computers, laptop computers, wearables, personal computers, enterprise computers, and the like.

Having set forth a series of definitions called-upon throughout this application, an example system architecture is described below for implementing example embodiments and features of the present disclosure.

Example System Architecture

Methods, apparatuses, systems, and computer-program products of the present disclosure may be embodied by any of a variety of computing devices. For example, the method, apparatus, system, and computer-program product of an example embodiment may be embodied by a network card or a networked device, such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

With reference to FIG. 1, an example computing system 100 within which some embodiments of the present disclosure operate is illustrated. In particular, FIG. 1 illustrates a communication access system 200 configured to communicate with one or client devices 101A-101N in accordance with some example embodiments described herein. Users may access the communication access system 200 via a communications network 102 using one or more of client devices 101A-101N. The communication access system 200 may include a communication access server 210 in communication with at least one repository, such as the communication access repository 235. Such repositories may be hosted by the communication access server 210 (of FIG. 2) or otherwise hosted by devices in communication with the communication access server 210. The communication access system 200 is, in some embodiments, able to generate a communication access interface including at least a state data of an accessed communication, wherein the communication access communication access interface is in association with the communication access system 200, as will be described below.

The communication access server 210 may include circuitry, networked processors, or the like configured to perform some or all of the communication access server-based processes described herein (e.g., accessing quantum communication devices transmitting one or more qubits at each time, determining a noise signal associated with the quantum communication channel, applying one or more measurements to the quantum communication channel, obtaining information associated with the one or more qubits based on the one or more measurements, etc.), and may be any suitable network server, network card, and/or other type of processing device. In this regard, the communication access server 210 may be embodied by any of a variety of devices, for example, the communication access server 210 may be embodied as a computer or a plurality of computers. For example, the communication access server 210 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the communication access server 210 may be located remotely from the communication access repository 235, although in other embodiments, the communication access server 210 may comprise the communication access repository 235. The communication access server 210 may, in some embodiments, comprise several servers or computing devices performing interconnected and/or distributed functions. Despite the many arrangements contemplated herein, the communication access server 210 is shown and described herein as a single computing device to avoid unnecessarily overcomplicating the disclosure.

The communication access server 210 may communicate with one or more client devices 101A-101N via the communications network 102. The communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the communication access system 200.

The communication access repository 235 may be stored by any suitable storage device configured to store some or all of the information described herein (e.g., memory 201 of communication access server 210 or a separate memory system separate from the communication access server 210, such as one or more database systems, backend data servers, network databases, cloud storage devices, or the like provided by another device (e.g., online application or 3rd party provider), such as a Network Attached Storage (NAS) device or devices, or as a separate database server or servers). The communication access repository 235 may include data received from the communication access server 210 (e.g., via a memory 201 and/or processor(s) 202) and/or a client device 101A-101N, and the corresponding storage device may thus store this data. The communication access repository 235 may include information accessed and stored by the communication access server 210 to facilitate the operations of communication access system 200. As such, the communication access repository 235 may include, for example, without limitation, communication access data such as noise signal data (e.g., which may be associated with noise signal generation data 215 of the communication access device(s) 201), measurement data (e.g., which may be associated with the measurement generation data 216 of the communication access device(s) 201), state data (e.g., which may be associated with the state data 217 of the communication access device(s) 201), and/or the like.

The client devices 101A-101N may be implemented as any computing device as defined above. That is, the client devices 101A-101N may also include circuitry, networked processors, or the like configured to perform some or all of the apparatus-based processes described herein and may include a suitable network server and/or other type of processing device (e.g., a controller or computing device of the client devices 101-101N). Electronic data received by the communication access server 210 from the client devices 101A-101N may be provided in various forms and via various methods. For example, the client devices 101A-101N may include desktop computers, laptop computers, smartphones, netbooks, tablet computers, wearables, and/or other networked device, that may be used for any suitable purpose in addition to presenting the communication access interface to a user and otherwise providing access to the communication access system 200. The depictions in FIG. 1 of "N" client devices are merely for illustration purposes. According to some embodiments, the client devices 101A-101N may be configured to display an interface on a display of the client device for viewing, editing, and/or otherwise interacting with at least one communication access interface, which may be provided by the communication access system 200.

In embodiments in which the client device 101A-101N is a mobile device, such as a smartphone or tablet, the client device 101A-101N may execute an "app" or "application" to interact with the communication access system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the client device 101A-101N may interact with the communication access system 200 via a web browser. As yet another example, the client devices 101A-101N may include various hardware or firmware designed to interface with the communication access system 200. Example embodiments contemplated herein may have various form factors and designs but will nevertheless include at least the components illustrated in FIG. 2 and described in connection therewith.

FIG. 2 illustrates a schematic block diagram of example circuitry, some or all of which may be included in the communication access server 210. In accordance with some example embodiments, the communication access server 210 may include various means, such as memory 201, processor 202, input/output circuitry 203, and/or communications circuitry 204. Moreover, in some embodiments, the communication access circuitry 205 may also or instead be included in the communication access server 210. For example, where communication access circuitry 205 is included in communication access server 210, communication access circuitry 205 may be configured to facilitate the functionality discussed herein regarding generating, causing storage of, updating, and/or retrieving communication access interface(s). An apparatus, such as communication access server 210, may be configured, using one or more of the circuitry 201, 202, 203, 204, and 205, to execute the operations described above with respect to FIG. 1 and below in connection with FIGS. 3, 4, and 5.

Although the use of the term "circuitry" as used herein with respect to components 201-205 are described in some cases using functional language, it should be understood that the particular implementations necessarily include the use of particular hardware configured to perform the functions associated with the respective circuitry as described herein. It should also be understood that certain of these components 201-205 may include similar or common hardware. For example, two sets of circuitries may both leverage use of the same processor, network interface, storage medium, or the like to perform their associated functions, such that duplicate hardware is not required for each set of circuitries. It will be understood in this regard that some of the components described in connection with the communication access server 210 may be housed within this device, while other components are housed within another of these devices, or by yet another device not expressly illustrated in FIG. 1.

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the communication access server 210 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of, for example, communication access server 210. The memory 201 is non-transitory and may include, for example, one or more volatile and/or non-volatile memories, or some combination thereof. In other words, for example, the memory 201 may be an electronic storage device (e.g., a non-transitory computer readable storage medium). The memory 201 may be configured to store information, data, content, applications, instructions, or the like, for enabling an apparatus, e.g., communication access server 210, to carry out various functions in accordance with example embodiments of the present disclosure.

Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data, applications, instructions, or the like for enabling the communication access server 210 to carry out various functions in accordance with example embodiments discussed herein. For example, in at least some embodiments, memory 201 is configured to buffer data for processing by processor 202. Additionally or alternatively, in at least some embodiments, memory 201 is configured to store program instructions for execution by processor 202. Memory 201 may store information in the form of static and/or dynamic information. This stored information may be stored and/or used by communication access server 210 during the course of performing its functionalities.

The processor 202 may be embodied in a number of different ways and may, for example, include one or more processing devices configured to perform independently. Additionally, or alternatively, processor 202 may include one or more processors configured in tandem via a bus to enable independent execution of instructions, pipelining, and/or multithreading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as communication access server 210. The plurality of processors may be in operative communication with each other and may be collectively configured to perform one or more functionalities of communication access server 210 as described herein.

In an example embodiment, processor 202 is configured to execute instructions stored in the memory 201 or otherwise accessible to processor 202. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform one or more algorithms and/or operations described herein when the instructions are executed. For example, these instructions, when executed by processor 202, may cause the communication access server 210 to perform one or more of the functionalities of the communication access server 210 as described herein.

In some embodiments, the communication access server 210 further includes input/output circuitry 203 that may, in turn, be in communication with processor 202 to provide an audible, visual, mechanical, or other output and/or, in some embodiments, to receive an indication of an input from a user, a client device 101A-101N, or another source. In that sense, the input/output circuitry 203 may include means for performing analog-to-digital and/or digital-to-analog data conversions. Input/output circuitry 203 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 203 may comprise a user interface and may comprise a web user interface, a mobile application, a kiosk, or the like. The processor 202 and/or user interface circuitry comprising the processor 202 may be configured to control one or more functions of a display or one or more user interface elements through computer-program instructions (e.g., software and/or firmware) stored on a memory accessible to the processor 202 (e.g., memory 201, and/or the like). In some embodiments, aspects of the input/output circuitry 203 may be reduced as compared to embodiments where the communication access server 210 may be implemented as an end-user machine or other type of device designed for complex user interactions. In some embodiments (like other components discussed herein), the input/output circuitry 203 may even be eliminated from communication access server 210. The input/output circuitry 203 may be in communication with the memory 201, the communications circuitry 204, and/or any other component(s), such as via a bus. Although more than one input/output circuitry and/or other component can be included in the communication access server 210, only one is shown in FIG. 2 to avoid overcomplicating the disclosure (e.g., like the other components discussed herein).

The communications circuitry 204, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with communication access server 210. In this regard, communications circuitry 204 may include, for example, a network interface for enabling communications with a wired or wireless communication network. For example, in some embodiments, communications circuitry 204 is configured to receive and/or transmit any data that may be stored by memory 201 using any protocol that may be used for communications between computing devices. For example, communications circuitry 204 may include one or more network interface cards, antennae, transmitters, receivers, buses, switches, routers, modems, and supporting hardware and/or software, and/or firmware/software, or any other device suitable for enabling communications via a network. Furthermore, given that the embodiments described herein leverage quantum communication techniques to encrypt and transmit data, the communications circuitry 204, the processor 202, and/or the memory 201 may be configured to perform any operation required to effectuate data transmission via a quantum communication channel.

Additionally or alternatively, in some embodiments, communications circuitry 204 includes circuitry for interacting with the antenna(s) to cause transmission of signals via the antenna(e) or to handle receipt of signals received via the antenna(e). These signals may be transmitted by communication access server 210 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of communication access server 210, such as via a bus.

In some embodiments, communication access circuitry 205 may also or instead be included and configured to perform the functionality discussed herein related to generating and updating a communication access interface(s). In some embodiments, communication access circuitry 205 includes hardware, software, firmware, and/or a combination of such components, configured to support various aspects of such communication access interface-related functionality, features, and/or services of the communication access server 210 as described herein (e.g., designed to generate a communication access interface based on at least the qubit states determined by the communication access system 200 and/or communication access server 210). It should be appreciated that in some embodiments, communication access circuitry 205 performs one or more of such exemplary actions in combination with another set of circuitry of the communication access server 210, such as one or more of memory 201, processor 202, input/output circuitry 203, and communications circuitry 204. For example, in some embodiments, communication access circuitry 205 utilizes processing circuitry, such as the processor 202 and/or the like, to perform one or more of its corresponding operations. In a further example, and in some embodiments, some or all of the functionality communication access circuitry 205 may be performed by processor 202. In this regard, some or all of the example processes and algorithms discussed herein can be performed by at least one processor 202 and/or communication access circuitry 205. It should also be appreciated that, in some embodiments, communication access circuitry 205 may include a separate processor, specially configured field programmable gate array (FPGA), or application specific interface circuit (ASIC) to perform its corresponding functions.

Additionally or alternatively, in some embodiments, the communication access circuitry 205 utilizes memory 201 to store collected information. For example, in some implementations, communication access circuitry 205 includes hardware, software, firmware, and/or a combination thereof, that interacts with at least one of the communication access repository 235, and/or memory 201 to send, retrieve, update, and/or store data values embodied by and/or associated with noise signal data, measurement data, state data, and associated data that is configured for association with, for example, generating and/or updating a communication access interface, and to support the operations of the communication access circuitry 205 and the remaining circuitry. Additionally or alternatively, in some embodiments, communication access circuitry 205 utilizes input/output circuitry 203 to facilitate user output (e.g., causing rendering of one or more user interface(s) such as a communication access interface), and/or to receive user input (e.g., user clicks, user taps, keyboard interactions, user gesture, and/or the like). Additionally or alternatively still, in some embodiments, the communication access circuitry 205 utilizes communications circuitry 204 to initiate transmissions to another computing device, receive transmissions from another computing device, communicate signals between the various sets of circuitry as depicted, and/or the like.

Accordingly, non-transitory computer readable storage media can be configured to store firmware, one or more application programs, and/or other software, which include instructions and/or other computer-readable program code portions that can be executed to control processors of the components of communication access server 210 to implement various operations, including the examples shown herein. As such, a series of computer-readable program code portions may be embodied in one or more computer-program products and can be used, with a device, communication access server 210, database, and/or other programmable apparatus, to produce the machine-implemented processes discussed herein. It is also noted that all or some of the information discussed herein can be based on data that is received, generated and/or maintained by one or more components of the communication access server 210. In some embodiments, one or more external systems (such as a remote cloud computing and/or data storage system) may also be leveraged to provide at least some of the functionality discussed herein.

Example Operations for Quantum Communication Channel Access

The method, apparatus (e.g., communication access server 210), and computer-program product of an example embodiment will now be described in conjunction with the operations illustrated in FIGS. 3, 4, and 5.

FIG. 3 depicts a flowchart that illustrates a series of operations or process blocks for obtaining information associated with one or more qubits transmitted using a quantum communication channel based on the one or more measurements in association with a communication access system, in accordance with some example embodiments of the present disclosure. The operations illustrated in FIG. 3 may, for example, be performed by, with the assistance of, and/or under the control of one or more apparatuses, such as the communication access server 210, as described above. In this regard, performance of the operations may invoke one or more of memory 201, processor 202, input/output circuitry 203, communications circuitry 204, and/or communication access circuitry 205.

As shown at operation 310, the apparatus (e.g., communication access server 210) includes means, such as processor 202, input/output circuitry 203, communications circuitry 204, communication access circuitry 205, and/or the like, for accessing a quantum communication channel transmitting one or more qubits thereon. By way of non-limiting example, the accessing of the quantum communication channel may be performed by a user of a client device (e.g., such as client device 101A-101N). By way of a particular example described herein after, the quantum communication channel may exist between a transmitting device (e.g., and an associated transmitting user) and a receiving device (e.g., and an associated receiving user). The quantum communication channel may be accessed by an eavesdropper, observer, and/or probing device.

By way of non-limiting example, a transmitting device may transmit a qubit stream representative of a key, as in a quantum key distribution (QKD) scheme or otherwise, one or more qubits to a receiving device. The eavesdropper or observer (e.g., a device associated with the eavesdropper or the observer) may wish to obtain information associated with the one or more qubits while remaining, with a large probability, undetected by the transmitting and/or receiving parties. The eavesdropper device may access the quantum communication channel by accessing the communication channel used by transmitting and receiving device, such as the communication network(s) 102 of FIG. 1 using, for instance, by using one or more client devices (e.g., client devices 101A-101N). By way of example, the eavesdropper may couple to an optical fiber used by the quantum communication channel or may redirect and detect qubits transmitted over free space. By way of another non-limiting example, a transmitting device may transmit one or more qubits to one or more quantum circuits (such as in a quantum processing unit (QPU)) and/or quantum interconnect. The observer (e.g., a device associated with the observer) may wish to obtain information associated with one or more qubits, either in the quantum communication channel and/or the quantum circuit directly or through a quantum probe, while not interfering with the quantum computation.

In some embodiments, one or more eavesdropper devices (such as client device(s) 101A-101N) may access the quantum communication(s) automatically and/or at predetermined intervals. For instance, the eavesdropper device (e.g., eavesdropper) may act on an "access now and/or store now, and decrypt later" method, such that each iteration of the quantum communications sent via the quantum communication channel (e.g., between the transmitting and receiving devices) are captured by the eavesdropper and decrypted at a later time. In some embodiments, predetermined intervals may be also specified for the accessing of the quantum communications, wherein the predetermined intervals may be random and/or be de determined at a previous time to capture by a user of the system. For instance, the eavesdropper (using an automated system or the like) may specify that the quantum communications are to be accessed at predetermined intervals, such as every hour, every thirty minutes, every fifteen minutes, every ten minutes, every five minutes, every minute, every thirty seconds, and/or the like. In some embodiments, access may occur in response to detection of a transmission via the communication channel.

As shown at operation 320, the apparatus (e.g., communication access server 210) includes means, such as processor 202, input/output circuitry 203, communications circuitry 204, communication access circuitry 205, and/or the like, for determining a current noise signal associated with the quantum communication channel. By way of example, the eavesdropper device may determine a current noise signal of the quantum communication channel used by the quantum communication between the transmitting device and the receiving device. In some embodiments, the eavesdropper device may determine the current noise signal of the quantum communication channel by way of previous quantum communication channel noise signals, by estimating the expected noise based on similar quantum communication channels, by the quantum communication channel's previous use and generated noise, as part of a calibration procedure of the quantum communication channel, etc.

In some embodiments, the current noise signal of the quantum communication channel may be determined by observing previous communications and/or previous communications channels used between the transmitting device and the receiving device. Based on the previous observation(s), the current noise signal may be determined to be approximate to (e.g., the same noise as the previous noise signals generated by the quantum communication channels and/or greater than or less than the previous noise, within a specified magnitude) the previous noise generated by the quantum communication channel(s). Such a specified strength or magnitude may be determined by the eavesdropper device, another actor, and/or based on previous interactions between the transmitting device and the receiving device when access by an observer or eavesdropper (e.g., measurements) were detected. In some embodiments, the quantum communication channel previously used by the transmitting device, or the receiving device may be used to determine the current noise signal. In some embodiments, these previous quantum communications channels used by the transmitting device and/or the receiving device may be stored in a repository, such as communication access repository 235 and/or memory 201, which may both be used by the system(s) (e.g., communication access system 200) and/or device(s) (e.g., communication access device(s) 201) to generate a current noise signal (e.g., noise signal generation data 215).

In some embodiments, the current noise signal of the communication channel may be determined by estimating the expected noise based on a similar communication channel. For instance, if the transmitting device and the receiving device are using a specified quantum communications channel of a particular type and/or equipment of a particular make or model, then the eavesdropper device (or another actor) may observe the similar communications channels to determine the current noise signal. In some embodiments, an identifier of the quantum communications channels and/or their associated devices may be used by the eavesdropper to determine the current noise signal(s). Furthermore, the medium by which the qubits are transmitted (e.g., the medium of the quantum communication channel) may further impact the current noise signal (e.g., free space-based channels may experience greater loss than fiber-based channels).

As shown at operation 330, the apparatus (e.g., communication access server 210) includes means, such as processor 202, input/output circuitry 203, communications circuitry 204, communication access circuitry 205, and/or the like, for applying one or more measurements to the quantum communication channel. A strength of at least one measurement of the one or more measurements may be based at least in part upon the current noise signal. For example, the one or more measurements may include two weak measurements on qubits and d weak measurements on qudits (where d is the number of the mutually unbiased bases). Given that each measurement's basis is different, each measurement may also be different. By way of example, and once the current noise signal has been determined, a device or system associated with the eavesdropper (e.g., communication access server 210 and/or communication access system 200) may apply one or more weak or variable strength measurements to the quantum communications channel based on the current noise signal. In some embodiments, in order to remain undetected by the transmitting device and the receiving device, the one or more measurements may be masked or otherwise concealed by the current noise signal associated with the quantum communication channel.

By way of example, the strength or magnitude of the measurements applied by the eavesdropper device or system to the communication channel may be substantially the same (e.g., correlated to the noise) as the strength or magnitude of the current noise signal associated with the communication channel. In some embodiments, the strength or magnitude of the measurements applied by the eavesdropper device or system to the communication channel may be less than the strength or magnitude of the current noise signal associated with the communication channel. In doing so, the measurements applied to the quantum communication channel by the eavesdropper device or system may be masked or concealed by the current noise of the quantum communication channel. In other words, the noise inputted into the communication channel in response to application of the measurement by the eavesdropper device may be substantially indistinguishable from the current noise signal associated with the communication channel.

In some embodiments, the current noise signal of the quantum communication channel may be sufficient to mask the noise generated by application of the measurement by the eavesdropper device. In other embodiments, the current noise signal associated with the quantum communication channel may be insufficient to conceal the noise generated by the measurement of the communication by the eavesdropper device. In such an instance, as shown in FIG. 4, the eavesdropper device may first introduce artificial noise into the quantum communication channel used by the transmitting and receiving device in order to further mask the measurements applied to the quantum communications channel. In this manner, the eavesdropper may artificially increase the expected or current noise of the quantum communication channel (e.g., give the impression to the transmitting and receiving device that the quantum communications channel comprises more noise than originally anticipated). In doing so, the expected noise for the communication may be artificially inflated in order to mask the noise generated by the measurements performed by the eavesdropping device. In other words, the eavesdropping device may introduce artificial noise to the communication channel during a calibration or initialization procedure such that the transmitting and receiving device determine that the acceptable amount of noise present in the communication channel to be increased. Thereafter, the weak or variable strength measurements may replace the artificial noise signal. In some embodiments, the operations described hereafter with reference to FIG. 4 may follow the application of the one or more measurements to the quantum communications channel but may precede operation 340 in obtaining information associated with the one or more qubits based on the one or more measurements.

As shown at operation 340, the apparatus (e.g., the communication access server 210) includes means, such as processor 202, input/output circuitry 203, communications circuitry 204, communication access circuitry 205, and/or the like, for obtaining information associated with the one or more qubits based on the one or more measurements. By way of example, the eavesdropper device may apply the one or more measurements to the quantum communications channel as described above. The one or more measurements may be a sequence of, for example, variable strength measurements that include at least one "weak" measurement so that access by the eavesdropper to the communication channel is undetected. Such weak measurements may be defined, for example, by a quantum bit error rate (QBER) of less than 10%.

In some embodiments, if a qubit is measured and its state is changed due to the measurement, the transmitting device and/or the receiving device may be alerted to the attempt to access the quantum communication channel (e.g., the presence of the eavesdropper device's access). In some instances, the transmitting device, the receiving device, and/or the quantum communication channel may define a tolerance value (e.g., detectability threshold or otherwise) indicative of the number or amount of qubits that may be flipped (e.g., qubits that have changed their respective states) before the quantum key is disregarded, and the transmitting and receiving device generate a new quantum key. In some embodiments, the eavesdropper device may access or determine this threshold and vary the strength or magnitude of the applied measurements to prevent detection. For example, the transmitting and receiving device may define a tolerance value of 11% indicating that a communication in which 11% or greater of the qubits received have state changes is to be discarded. In such an example, the eavesdropper device may apply weak measurements that result in less than 11% of the qubits having a state change in order to proceed without detection.

Although described herein with reference to accessing the quantum communication channel by an eavesdropper without detection by the transmitting and receive devices, the present disclosure contemplates that the operations of FIG. 3 may be used to inform or characterize the quantum communication channel. By way of example, the transmitting device and/or the receiving device may employ one or more minimally disturbing measurements (e.g., "weak" measurements) in order to characterize the quantum communication channel so as to further anticipate attempts to access the quantum communication channel by potential eavesdroppers. In other words, the operations of FIG. 3 may be used by the valid participants of the quantum communication channel in order to strength the encryption used by the communication channel to prevent access to the channel by unintended devices. For example, the operations of FIG. 3 may be used by the communicating parties to better assess the level of security of their quantum communication channel and/or used by a non-malicious party to study non-invasively the information content of a quantum communication channel and/or the non-idealities of the transmitting and receive devices and or the quantum communication channel, and to compensate these non-idealities through electronic feedback to HW and/or FFE and/or other methods.

FIG. 4 depicts a flowchart that illustrates a series of operations or process blocks for artificial noise signal application, in accordance with some example embodiments of the present disclosure. The operations illustrated in FIG. 4 may, for example, be performed by, with the assistance of, and/or under the control of one or more apparatuses, such as communication access server 210, as described above. In this regard, performance of the operations may invoke one or more of memory 201, processor 202, input/output circuitry 203, communications circuitry 204, and/or communication access circuitry 205.

As shown at operation 410, the apparatus (e.g., communication access server 210) includes means, such as processor 202, input/output circuitry 203, communications circuitry 204, communication access circuitry 205, and/or the like, for applying an artificial noise signal to the communication channel. By way of continued example, the eavesdropper device or system (e.g., communication access system 200 and/or communication access server 210) may apply an artificial noise signal to the communication channel that may be based upon the current noise signal determined in operation 320. By way of non-limiting example, the artificial noise signal applied to the quantum communication channel may be of a specified strength or magnitude that results in an increase to the current noise signal associated with the quantum communication channel.

In some embodiments, the application of the artificial noise signal described at operation 410 may further include one or more operations by the eavesdropper device to impact or otherwise affect the instruments or equipment associated with the transmitting device and/or the receiving device. By way of a non-liming example, the eavesdropper device may illuminate (e.g., via a laser or otherwise) the output of the transmitting device so as to modify or at least partially control the output of this device. In doing so, the eavesdropper may operate to create leverage (e.g., impact the QBER of the quantum communication channel) in order to prevent detection. Although described herein with reference to illumination of the transmitting device, the present disclosure contemplates that the eavesdropper may employ any technique for modifying the QBER of the quantum communication channel so as to increase the likelihood that the eavesdropper remains undetected.

Additionally or alternatively, the eavesdropper (e.g., eavesdropper device) may employ medium switching in order to impact the expected noise of the quantum communication channel. By way of a non-limiting example, the transmitting device and the receiving device may utilize a quantum communication channel that is implemented over a free space communication medium. Given that a free space quantum key distribution (QKD) protocol is relatively noisier than a fiber-based implementation, the eavesdropper may teleport photons generated by the transmitting device to an optical fiber that is relatively less noisy than the free space used by the quantum communication channel, perform measurements, and transmit the photons to the receiving device. In doing so, the eavesdropper may leverage weak measurements to remain undetected.

In some embodiments, and as shown at operation 420, the apparatus (e.g., communication access server 210) includes means, such as processor 202, input/output circuitry 203, communications circuitry 204, communication access circuitry 205, and/or the like, for determining if the current noise signal fails to satisfy a detectability threshold. By way of example, a detectability threshold may be determined by a user (e.g., eavesdropper) of the system (e.g., communication access system 200 and/or communication access server 210). Such a detectability threshold may be based on previous instances in which the eavesdropper and/or other actors have been detected by the transmitting device and/or the receiving device. For instance, the eavesdropper device may store previous instances of detection in a repository, such as the communication access repository 235, and may use the previous instances of detection (along with the associated noise signals for each instance), in order to determine a detectability threshold of the total noise signal for the quantum communications channel.

In some embodiments, once the detectability threshold has been determined and a current noise signal for the quantum communications channel has been determined, the eavesdropper device may determine an artificial noise signal to insert into the quantum communications channel that may increase the current noise signal for the quantum communication channel. In some particular instances, the artificial noise signal may be determined as a mathematical difference between the detectability threshold and the initially current noise signal (e.g., the current noise signal prior to the operations of FIG. 4). By way of a non-limiting example, if the detectability threshold is 10%, then the threshold of qubit states allowed to be flipped and/or destabilized will be 10% of the total qubits transmitted before either the transmitting device or the receiving device aborts the quantum communication via the quantum communication channel. In some embodiments, the detectability threshold may be predetermined by the transmitting or receiving device before quantum communications and then determined by the eavesdropper device based on a one or more measurements or a plurality of measurements over a plurality of quantum communications and the associated detectability thresholds of the plurality of quantum communications. For example, the eavesdropper device may determine the detectability threshold often used by the transiting or receiving device based on previous iterations of measurements that were detected by either the transmitting or receiving device.

In some embodiments, and as shown at operation 430, the apparatus (e.g., communication access server 210) includes means, such as processor 202, input/output circuitry 203, communications circuitry 204, communication access circuitry 205, and/or the like, for subsequently eliminating the artificial noise signal from the quantum communication channel. By way of example, the eavesdropper device or system (e.g., communication access system 200 and/or communication access server 210) may eliminate the artificial noise signal from the communication signal before applying the one or more measurements to the quantum communication channel. For example, the artificial noise signal may be applied as part of a calibration procedure for the quantum communication channel. Following elimination of the artificial noise signal, the one or more measurements may be applied to the quantum communications channel by the eavesdropper device, and the noise introduced by the one or more measurements may be effectively masked or concealed by the artificial noise signal applied during calibration (e.g., the measurements replace the noise signal).

FIG. 5 depicts a flowchart that illustrates a series of operations or process blocks for modifying the strength or magnitude of the one or more measurements, in accordance with some example embodiments of the present disclosure. The operations illustrated in FIG. 5 may, for example, be performed by, with the assistance of, and/or under the control of one or more apparatuses, such as communication access server 210, as described above. In this regard, performance of the operations may invoke one or more of memory 201, processor 202, input/output circuitry 203, communications circuitry 204, and/or communication access circuitry 205.

In some embodiments, and as shown at operation 510, the apparatus (e.g., communication access server 210) includes means, such as processor 202, input/output circuitry 203, communications circuitry 204, communication access circuitry 205, and/or the like, for performing a plurality of iterations of the one or more measurements over a plurality of quantum communication sequences. By way of example, the eavesdropper device or system (e.g., communication access system 200 and/or communication access server 210) may perform a plurality of iterations of the one or more measurements over a plurality of quantum communication sequences and may store the plurality of iterations and the associated information obtained during these measurements in a repository, such as communication access repository 235. The plurality of iterations of the one or more measurements over the plurality of quantum communication sequences may be performed for quantum communications between specific parties (e.g., the transmitting and receiving devices), of a plurality of parties using a plurality of communications channels and a plurality of quantum key distributions.

In some embodiments, and as shown at operation 520, the apparatus (e.g., communication access server 210) includes means, such as processor 202, input/output circuitry 203, communications circuitry 204, communication access circuitry 205, and/or the like, for determining an expected preparation or measurement basis of the one or more qubits based on the plurality of iterations of the one or more measurements over the plurality of quantum communication sequences. For example, the eavesdropper device may determine the expected basis (e.g., the more frequently used basis) of the one or more qubits based on previous performances of iterations of the one or more measurements over the quantum communication sequences. This knowledge of the more frequently used basis may operate to assist the eavesdropper device is remaining undetected by this eavesdropper modifying the measurements according to this more frequently basis, thereby generating less disturbance.

In some embodiments, the communication access system (e.g., communication access system 200 and/or communication access server 210) may use the stored qubit states of previous measurements that were determined by quantum communications shared between users (e.g., the transmitting and receiving device) to determine an expected basis (e.g., the more frequently used basis) for future qubit states shared between the same devices or users. In some embodiments, the communication access repository may store specific user databases such that only those qubit states (e.g., obtained information) previously determined by a plurality of iterations are stored remotely based on the specified users of the quantum key distribution such that the communication access system 200 and/or communication access server 210 may access a single database within the repository for each user and based upon the generating user (e.g., a database specific to transmitting device or user for the quantum keys generated by the transmitting device or use).

In some embodiments, once the previous plurality of iterations have been determined, the eavesdropper may use the plurality of iterations to determine a likelihood of a state of a qubit of a current quantum key distribution. For example, if the transmitting device or user tends to use a specific state for the qubits transmitted by the transmitting device, the communication access system 200 may determine that there is an increased likelihood this state will be used for the current quantum key distribution protocol used by the transmitting device.

In some embodiments, and as shown at operation 530, the apparatus (e.g., communication access server 210) includes means, such as processor 202, input/output circuitry 203, communications circuitry 204, communication access circuitry 205, and/or the like, for collecting, based on the plurality of iterations of the one or more measurements over the plurality of iterations of the one or more measurements over the plurality of quantum communication sequences, a database of quantum communications associated with at least the identifier of the specified user. By way of example, the eavesdropper device or system (e.g., communication access system 200 and/or communication access server 210) may collect—from a plurality of iterations of the measurements taken from a plurality of quantum communication sequences—data regarding the plurality of quantum communication sequences from a plurality of users. Such data may include measurements that were detected by the users during previous measurements of the plurality of quantum communications, measurements that were undetected by the users during previous measurements, noise signals of the communications channels during the plurality of quantum communications channels (including artificial noise signals generated, current noise signals, and/or the like), and/or state data of the qubits for the plurality of quantum communications.

This data collected, may then be stored in a memory of the system (e.g., the communication access repository 235 and/or memory 201). Each of the data entries collected may be linked and/or associated—within a database of quantum communications—with identifiers of the specified users of the specific quantum communication the data is collected from. For instance, if the receiving device generates and sends a quantum key to the transmitting device, then any data collected by the communication access system 200 and/or communication access server 210 may associated with an identifier specific to the receiving device as defined above.

In some embodiments, and as shown at operation 540, the apparatus (e.g., communication access server 210) includes means, such as processor 202, input/output circuitry 203, communications circuitry 204, communication access circuitry 205, and/or the like, for modifying the strength or magnitude of the one or more measurements based at least in part upon data received from the database of quantum communications. By way of example, the eavesdropper device or system (e.g., communication access system 200 and/or communication access server 210) may modify the strength or magnitude of the one or more measurements based upon the previous iterations of measurements taken and collected to generate the database of quantum communications. Such a modification may comprise increasing and/or decreasing the strength or magnitude of the measurements taken.

In some embodiments, the database of quantum communications may be used by the system (e.g., communication access system 200 and/or communication access server 210) to generate a pattern of decisions by the transmitting device, the receiving device, quantum computing circuitry and/or electronics, or other users of the communication channel (e.g., quantum communication channel). In this manner, the data regarding noise signals (e.g., current noise signals, artificial noise signals previously used, and/or the like), measurements used, and/or qubit states, may be used by the system to generate channel or user specific measurements to be used to determine the qubits states, wherein the optimization may occur based on the measurements that will return the most information (e.g., qubit states or otherwise) without detection by the transmitting or receiving device. In some embodiments, the data regarding previous qubit states may additionally be used by the system (e.g., communication access system 200 and/or communication access server 210) to predict future qubit states that the transmitting or receiving devices may use in the quantum communications.

Many modifications and other embodiments of the present inventions set forth herein will come to mind to one skilled in the art to which these inventions pertain having the benefit of the teachings presented in the foregoing descriptions and the associated drawings. Therefore, it is to be understood that the present inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for accessing and characterizing quantum communication channels, the method comprising:
   accessing a quantum communication channel transmitting one or more qubits;
   determining a current noise signal associated with the quantum communication channel;
   applying one or more measurements to the quantum communication channel, wherein a strength of at least one measurement of the one or more measurements is based at least in part upon the current noise signal; and
   obtaining information associated with the one or more qubits based on the one or more measurements.

2. The method according to claim 1, wherein the one or more measurements comprises at least one weak measurement.

3. The method according to claim 1, in response to determining the current noise signal associated with the quantum communication channel and prior to applying the one or more measurements, further comprising:
   applying an artificial noise signal to the quantum communication channel; and
   subsequently eliminating the artificial noise signal from the quantum communication channel.

4. The method according to claim 3, wherein the application of the artificial noise signal to the quantum communication channel occurs in an instance in which the current noise signal fails to satisfy a detectability threshold.

5. The method according to claim 1, wherein the current noise signal is determined at least in part based upon at least one piece of equipment associated with the quantum communication channel.

6. The method according to claim 1, further comprising:
   performing a plurality of iterations of the one or more measurements over a plurality of quantum communication sequences, wherein the plurality of quantum communication sequences share at least an identifier of a specified user; and determining an expected preparation or measurement basis of the one or more qubits based on the plurality of iterations of the one or more measurements over the plurality of quantum communication sequences.

7. The method according to claim 6, further comprising collecting, based on the plurality of iterations of the one or more measurements over the plurality of quantum communication sequences, a database of quantum communications associated with at least the identifier of the specified user.

8. The method according to claim 7, further comprising modifying the strength of the one or more measurements based at least in part upon data received from the database of quantum communications.

9. A computer program product for accessing and characterizing quantum communication channels comprising at least one non-transitory computer-readable storage medium having computer program code thereon that, in execution with at least one processor, configures the computer program product for:

accessing a quantum communication channel transmitting one or more qubits;

determining a current noise signal associated with the quantum communication channel;

applying one or more measurements to the quantum communication channel, wherein a strength of at least one measurement of the one or more measurements is based at least in part upon the current noise signal; and obtaining information associated with the one or more qubits based on the one or more measurements.

10. The computer program product according to claim 9, wherein the one or more measurements comprises at least one weak measurement.

11. The computer program product according to claim 9, in response to determining the current noise signal associated with the quantum communication channel and prior to applying the one or more measurements, further configured for:

applying an artificial noise signal to the quantum communication channel; and subsequently eliminating the artificial noise signal from the quantum communication channel.

12. The computer program product according to claim 11, wherein the application of the artificial noise signal to the quantum communication channel occurs in an instance in which the current noise signal fails to satisfy a detectability threshold.

13. The computer program product according to claim 9, wherein the current noise signal is determined at least in part based upon at least one piece of equipment associated with the quantum communication channel.

14. The computer program product according to claim 9, further configured for:

performing a plurality of iterations of the one or more measurements over a plurality of quantum communication sequences, wherein the plurality of quantum communication sequences share at least an identifier of a specified user; and determining an expected preparation or measurement basis of the one or more qubits based on the plurality of iterations of the one or more measurements over the plurality of quantum communication sequences.

15. The computer program product according to claim 14, further configured for collecting, based on the plurality of iterations of the one or more measurements over the plurality of quantum communication sequences, a database of quantum communications associated with at least the identifier of the specified user.

16. The computer program product according to claim 15, further configured for modifying the strength of the one or more measurements based at least in part upon data received from the database of quantum communications.

17. An apparatus for accessing and characterizing quantum communication channels comprising at least one processor and at least one memory, the at least one memory having computer-code instructions stored thereon that, in execution with the at least one processor, configure the apparatus to:

access a quantum communication channel transmitting one or more qubits;

determine a current noise signal associated with the quantum communication channel;

apply one or more measurements to the quantum communication channel, wherein a strength of at least one measurement of the one or more measurements is based at least in part upon the current noise signal; and obtain information associated with the one or more qubits based on the one or more measurements.

18. The apparatus according to claim 17, wherein the one or more measurements comprises at least one weak measurement.

19. The apparatus according to claim 17, wherein, in response to determining the current noise signal associated with the quantum communication channel and prior to applying the one or more measurements, the apparatus is further configured to:

apply an artificial noise signal to the quantum communication channel; and subsequently eliminate the artificial noise signal from the quantum communication channel.

20. The apparatus according to claim 19, wherein the application of the artificial noise signal to the quantum communication channel occurs in an instance in which the current noise signal fails to satisfy a detectability threshold.

* * * * *

UNITED STATES PATENT AND TRADEMARK OFFICE
CERTIFICATE OF CORRECTION

PATENT NO. : 11,949,463 B1
APPLICATION NO. : 18/220990
DATED : April 2, 2024
INVENTOR(S) : Tali Septon et al.

Page 1 of 1

It is certified that error appears in the above-identified patent and that said Letters Patent is hereby corrected as shown below:

On the Title Page

Please change the Assignee so that Item (73) reads:
Assignees: Mellanox Technologies, Ltd., Yokneam (IL); Bar-Ilan University, Ramat Gan (IL)

Signed and Sealed this
Seventh Day of May, 2024

Katherine Kelly Vidal
*Director of the United States Patent and Trademark Office*